United States Patent
Onogawa et al.

(10) Patent No.: US 12,286,093 B2
(45) Date of Patent: Apr. 29, 2025

(54) METHOD FOR CONTROLLING VEHICLE AND SYSTEM FOR CONTROLLING VEHICLE

(71) Applicant: Nissan Motor Co., Ltd., Yokohama (JP)

(72) Inventors: Ryo Onogawa, Kanagawa (JP); Azusa Kobayashi, Kanagawa (JP); Yoshihiro Terai, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 312 days.

(21) Appl. No.: 18/018,004

(22) PCT Filed: Jul. 28, 2020

(86) PCT No.: PCT/JP2020/028930
§ 371 (c)(1),
(2) Date: Jan. 25, 2023

(87) PCT Pub. No.: WO2022/024228
PCT Pub. Date: Feb. 3, 2022

(65) Prior Publication Data
US 2023/0271598 A1      Aug. 31, 2023

(51) Int. Cl.
*B60W 20/13*       (2016.01)
(52) U.S. Cl.
CPC ......... *B60W 20/13* (2016.01); *B60W 2520/00* (2013.01); *B60W 2555/00* (2020.02)
(58) Field of Classification Search
None
See application file for complete search history.

(56) References Cited

U.S. PATENT DOCUMENTS

| 6,175,217 | B1 * | 1/2001 | Da Ponte | H02P 9/04 |
| | | | | 322/19 |
| 6,507,127 | B1 * | 1/2003 | Amano | B60L 50/61 |
| | | | | 290/40 C |
| 2014/0195084 | A1 | 7/2014 | Jeda et al. | |
| 2014/0209047 | A1 * | 7/2014 | Hagman | F02D 41/021 |
| | | | | 701/104 |
| 2016/0325733 | A1 | 11/2016 | Baba et al. | |
| 2019/0283590 | A1 * | 9/2019 | Koebler | G01C 21/3469 |

FOREIGN PATENT DOCUMENTS

| CN | 105899390 A | 8/2016 |
| JP | 2009-173235 A | 8/2009 |
| JP | 2009-220765 A | 10/2009 |
| JP | 2012-60844 A | 3/2012 |
| JP | 2014-133457 A | 7/2014 |
| JP | 2019-123378 A | 7/2019 |
| JP | 2020-11649 A | 1/2020 |

* cited by examiner

*Primary Examiner* — Daniel L Greene
*Assistant Examiner* — Daniel L Greene, Jr.
(74) *Attorney, Agent, or Firm* — Young Basile Hanlon & MacFarlane, P.C.

(57) ABSTRACT

A vehicle control system increases the travel distance of a vehicle by inhibiting reduction in the SOC of a battery even when the output of an engine is limited. The control system is characterized by comprising: an electric motor that drives a vehicle: an engine that drives a power generator that generates electric power to be supplied to the electric motor; a battery that is configured to be chargeable by the power generator and that is electrically connected to the electric motor; and a controller that controls the electric motor.

7 Claims, 7 Drawing Sheets

METHOD FOR CONTROLLING VEHICLE AND SYSTEM FOR CONTROLLING VEHICLE

TECHNICAL FIELD

The present invention relates to a method for controlling a vehicle and a system for controlling a vehicle, the vehicle includes an electric motor that drives the vehicle and an engine that drives a generator that generates electric power to be supplied to the electric motor.

BACKGROUND ART

In the related art, there has been known a so-called series hybrid vehicle including an electric motor that drives the vehicle and an engine that drives a generator that generates electric power to be supplied to the electric motor. In the case of this series hybrid vehicle, the engine is stopped or operated in accordance with a state of charge of the battery and required electric power of the vehicle.

However, since the air density is low and an engine output is reduced at a high altitude, the electric power generated by the engine is reduced more than at a level ground. Therefore, for example, JP2014-133457A discloses an engine operation control device for a hybrid vehicle that performs correction such that a set rotation speed of an engine increases as the atmospheric pressure at a current position of a vehicle decreases.

SUMMARY OF INVENTION

In the above-described related art, since the set rotation speed of the engine is increased as the atmospheric pressure decreases, it is possible to ensure a certain amount of electric power generated by the engine even at a high altitude. However, when a state in which the output of the electric motor is large continues as in a case where the vehicle travels on an expressway at a high altitude, an SOC of the battery may decrease, and a travel distance of the vehicle may become short.

An object of the present invention is to prevent a decrease in SOC of a battery and to extend a travel distance of a vehicle even when an output of an engine is limited.

A method for controlling a vehicle according to one embodiment of the present invention is a method for controlling a vehicle, the vehicle including an electric motor configured to drive the vehicle, an engine configured to drive a generator that generates electric power to be supplied to the electric motor, and a battery configured to be charged by the generator and electrically connected to the electric motor, and the method for controlling a vehicle including, a control step of limiting a driving force of the electric motor in a case where the vehicle is traveling in an environment in which an output of the engine is limited.

DESCRIPTION OF EMBODIMENTS

Hereinafter, an embodiment of the present invention will be described with reference to the accompanying drawings.
[Configuration Example of Vehicle]

Figure 1:
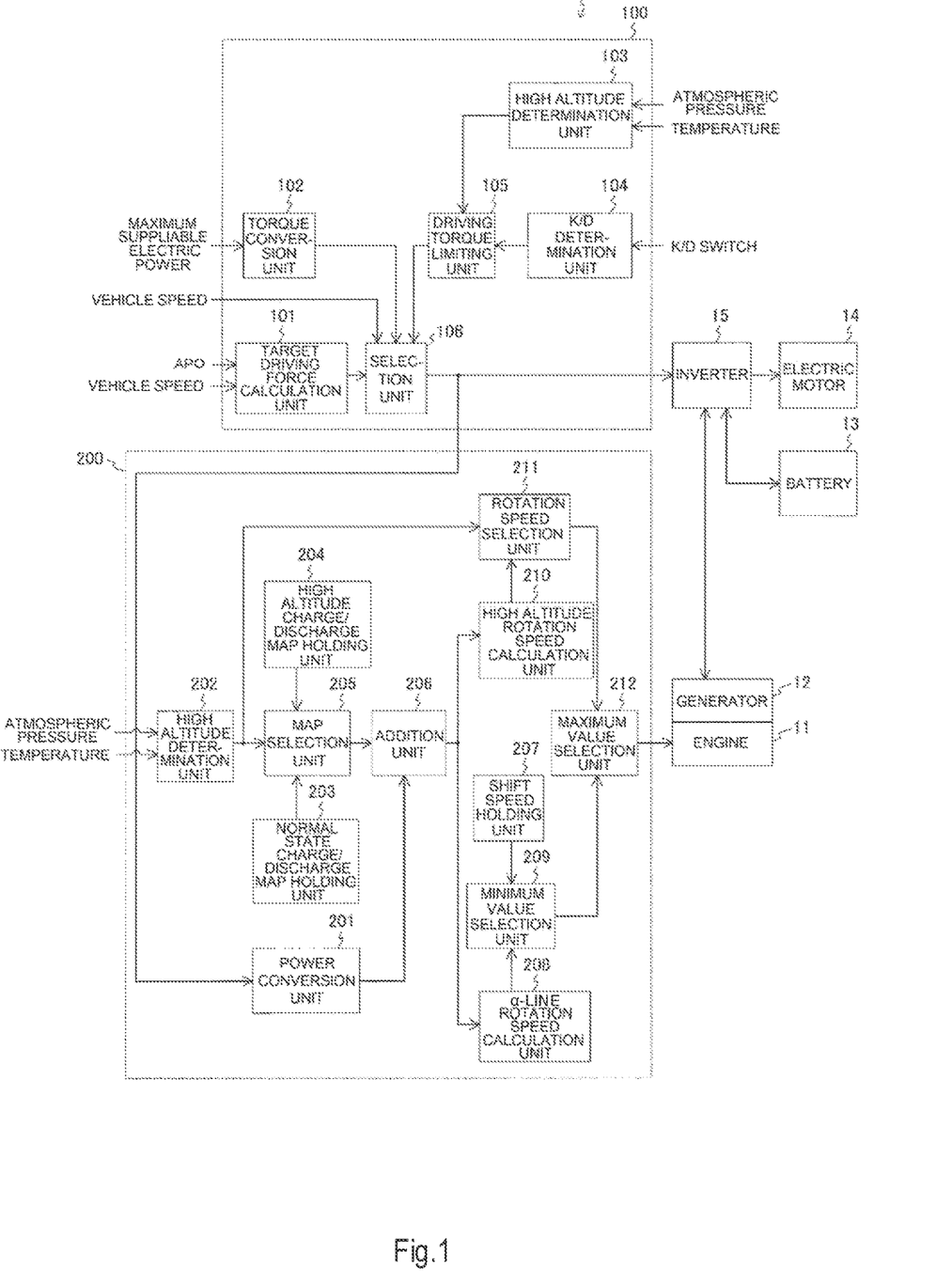
FIG. 1 is a block diagram illustrating a configuration example of a vehicle according to a first embodiment of the present invention.

FIG. 1 is a block diagram illustrating a configuration example of a vehicle 1 according to a first embodiment of the present invention.

The vehicle 1 includes an engine 11, a generator 12, a battery 13, an electric motor 14, an inverter 15, a drive system controller 100, and a power generation system controller 200. The vehicle 1 also includes a kickdown switch (not illustrated) that is actuated when an accelerator pedal is depressed to a predetermined position. The kickdown switch may also be referred to as a depression force step pedal.

Each of the drive system controller 100 and the power generation system controller 200 is a control device that controls various devices, and is implemented by a microcomputer including, for example, a central processing unit (CPU), a read only memory (ROM), a random access memory (RAM), and an input/output interface (I/O interface).

The drive system controller 100 functions as a control unit that controls operations of various devices such as the battery 13, the electric motor 14, and the inverter 15 provided in the vehicle 1 by executing a specific program.

The power generation system controller 200 functions as a control unit that controls operations of various devices such as the engine 11, the generator 12, and the battery 13 provided in the vehicle 1 by executing a specific program.

Each of the drive system controller 100 and the power generation system controller 200 may be implemented by a plurality of microcomputers instead of being implemented by one microcomputer. In addition, the drive system controller 100 and the power generation system controller 200 may be implemented by a single microcomputer. In this way, the drive system controller 100 and the power generation system controller 200 implement a system for controlling the vehicle 1.

The vehicle 1 is implemented as a so-called series hybrid vehicle in which electric power generated by the generator 12 using power of the engine 11 is supplied to the battery 13 via the inverter 15, and the electric motor 14 is caused to rotate based on the electric power of the battery 13 to drive drive wheels (not illustrated) of the vehicle 1. Therefore, in the vehicle 1, the engine 11 is used not as a power source for causing the vehicle 1 to travel but as a power source for causing the generator 12 to generate electric power.

The engine 11 is a so-called internal combustion engine using gasoline or the like as fuel, and is mechanically connected to the generator 12. The engine 11 is used as a drive source for rotationally driving the generator 12 when the battery 13 is charged or the like.

The generator 12 generates electric power by rotating in accordance with the power from the engine 11, and is able to charge the battery 13. The generator 12 also causes the engine 11 to perform a power running operation (motoring) by being rotationally driven by the electric power of the battery 13. As described above, by executing a motoring control for causing the engine 11 to rotate by using power of the generator 12, it is possible to crank the engine 11 at the time of starting the engine 11, or to close a throttle valve to generate a negative pressure in an intake passage when a negative pressure for brake pedal assist is required. As described above, the generator 12 functions as both a power generation motor and an engine starter.

The drive system controller 100 includes a target driving force calculation unit 101, a torque conversion unit 102, a high altitude determination unit 103, a K/D determination unit 104, a driving torque limiting unit 105, and a selection unit 106.

The target driving force calculation unit 101 calculates a driving force (torque command value of the electric motor 14) required by the vehicle 1 based on an accelerator position (accelerator opening degree) (APO) and a vehicle speed, and outputs a calculation result thereof to the selection unit 106. Incidentally, the driving force is also referred to as a driving torque. The accelerator position can be acquired based on an operation amount of the accelerator pedal in the vehicle 1, and the vehicle speed can be acquired by a vehicle speed sensor in the vehicle 1.

The torque conversion unit 102 calculates a driving force that can be supplied from the battery 13 to the electric motor 14 based on a maximum suppliable electric power of the battery 13, and outputs a calculation result thereof to the selection unit 106.

The high altitude determination unit 103 determines whether the vehicle 1 is traveling in an environment in which the output of the engine 11 is limited, and outputs a determination result thereof to the driving torque limiting unit 105. Here, the environment in which the output of the engine 11 is limited is, for example, an environment in which the air density is low. That is, the environment in which the output of the engine 11 is limited is, for example, an environment in which an intake air amount of the engine 11 decreases. In addition, the environment in which the output of the engine 11 is limited can also be considered as an environment in which an amount of electric power generated by the engine 11 cannot be sufficiently ensured. The environment in which the output of the engine 11 is limited means, for example, a place exceeding a predetermined elevation, that is, a high altitude. In addition, the environment in which the output of the engine 11 is limited means, for example, a place of a predetermined temperature or higher, for example, a region in a tropical zone. However, in the first embodiment, for ease of description, an example, in which a case where the vehicle 1 reaches an elevation TH1 (see FIGS. 3A to 3D) is determined as the environment in which the output of the engine 11 is limited, will be described. The elevation TH1 can be set to, for example, about 2,800 m.

Specifically, the high altitude determination unit 103 acquires an atmospheric pressure from an atmospheric pressure sensor that measures an atmospheric pressure of air taken in by the engine 11, and acquires a temperature from a temperature sensor that measures a temperature of the air taken in by the engine 11. Then, the high altitude determination unit 103 obtains the air density at a place where the vehicle 1 is present based on the acquired atmospheric pressure and temperature, and determines whether the vehicle 1 has reached the elevation TH1 based on the air density. Specifically, when the air density is equal to or greater than a predetermined value, the high altitude determination unit 103 determines that the vehicle is not present at a high altitude, and when the air density is less than the predetermined value, the high altitude determination unit 103 determines that the vehicle is present at a high altitude. In the present embodiment, an example in which high altitude determination is performed using the atmospheric pressure and the temperature is described, but the high altitude determination may be performed using at least one of the atmospheric pressure and the temperature. A determination example will be described in detail with reference to FIGS. 3A to 3D.

The K/D determination unit 104 determines whether the kickdown switch is turned on by a driver based on a signal from the kickdown switch, and outputs a determination result thereof to the driving torque limiting unit 105.

The driving torque limiting unit 105 sets a limit value for limiting the driving force of the electric motor 14 based on the determination result output from the high altitude determination unit 103 and the determination result output from the K/D determination unit 104, and outputs the limit value to the selection unit 106. A method of setting the limit value of the driving force will be described in detail with reference to FIGS. 3C, 3D, and 4.

The selection unit 106 selects a driving force (torque command value of the electric motor 14) required by the vehicle 1 based on the driving force output from the target driving force calculation unit 101, the driving force output from the torque conversion unit 102, and the limit value output from the driving torque limiting unit 105, and outputs a selection result thereof to the inverter 15 and a power conversion unit 201. Specifically, the selection unit 106 selects a minimum value among values output from the target driving force calculation unit 101, the torque conversion unit 102, and the driving torque limiting unit 105. The selection unit 106 outputs the selected value to the power conversion unit 201 of the power generation system controller 200 as information indicating how much driving torque is required as the driving torque of the electric motor 14.

The power generation system controller 200 includes a power conversion unit 201, a high altitude determination unit 202, a normal state charge/discharge map holding unit 203, a high altitude charge/discharge map holding unit 204, a map selection unit 205, an addition unit 206, a shift speed holding unit 207, an α-line rotation speed calculation unit 208, a minimum value selection unit 209, a high altitude rotation speed calculation unit 210, a rotation speed selection unit 211, and a maximum value selection unit 212.

The power conversion unit 201 converts the driving force (torque command value of the electric motor 14) output from the selection unit 106 into a power value (output power value of the battery 13), and outputs the converted power value to the addition unit 206.

The high altitude determination unit 202 determines whether the vehicle 1 is traveling in an environment in which the output of the engine 11 is limited, and outputs a determination result thereof to the map selection unit 205 and the rotation speed selection unit 211. A determination method thereof is the same as that of the high altitude determination unit 103. In addition, in the power generation system controller 200, the high altitude determination unit 202 may be omitted, and the determination result from the high altitude determination unit 103 may be used.

The normal state charge/discharge map holding unit 203 holds a normal state charge/discharge map to be used when it is determined that the vehicle 1 is in a place (normal place) other than the high altitude, and supplies the held charge/discharge map to the map selection unit 205. The normal state charge/discharge map will be described in detail with reference to FIG. 2A.

The high altitude charge/discharge map holding unit 204 holds a high altitude charge/discharge map to be used when it is determined that the vehicle 1 is present at a high altitude, and supplies the held charge/discharge map to the map selection unit 205. The high altitude charge/discharge map will be described in detail with reference to FIG. 2B.

The map selection unit 205 selects a charge/discharge map to be used for charging/discharging the battery 13 based on the determination result obtained by the high altitude determination unit 202, and supplies the selected charge/discharge map to the addition unit 206. Specifically, the map selection unit 205 selects a high altitude charge/discharge map when the high altitude determination unit 202 determines that the vehicle is present at a high altitude, and selects a normal state charge/discharge map when the high altitude determination unit 202 does not determine that the vehicle is present at a high altitude.

The addition unit 206 adds the power value output from the power conversion unit 201 and a value specified by the charge/discharge map output from the map selection unit 205, and outputs an addition result to the α-line rotation speed calculation unit 208 and the high altitude rotation speed calculation unit 210. That is, calculations by the α-line rotation speed calculation unit 208 and the high altitude rotation speed calculation unit 210 are performed in consideration of the power value (output power value of the battery 13) corresponding to the torque command value of the electric motor 14 and the charge/discharge map corresponding to the result of the high altitude determination.

The shift speed holding unit 207 holds a shift speed (rotation speed for each vehicle speed) in which an optimum rotation speed of the engine 11 is set for each vehicle speed in consideration of the fuel efficiency and a generated sound of the engine 11, and supplies the held shift speed to the minimum value selection unit 209.

The α-line rotation speed calculation unit 208 calculates an α-line rotation speed based on an addition value output from the addition unit 206, and outputs a calculation result thereof to the minimum value selection unit 209. Here, the α-line indicates a rotation speed at which the engine 11 has the highest fuel efficiency for each engine output. That is, the rotation speed of the engine 11 with the highest fuel efficiency can be obtained for each addition value by the α-line.

The minimum value selection unit 209 selects a smaller value from the calculation result obtained by the α-line rotation speed calculation unit 208 and the shift speed held in the shift speed holding unit 207, and supplies the selected value to the maximum value selection unit 212. That is, the minimum value selection unit 209 selects a smaller value from the α-line rotation speed obtained in accordance with the addition value output from the addition unit 206 and the optimum rotation speed corresponding to the vehicle speed of the vehicle 1.

The high altitude rotation speed calculation unit 210 calculates a rotation speed of the engine 11 for high altitude based on the addition value output from the addition unit 206, and outputs a calculation result thereof to the rotation speed selection unit 211. The rotation speed of the engine 11 for high altitude is a value used for obtaining a torque required at a high altitude at a rotation speed as low as possible in consideration of the environment at the high altitude.

The rotation speed selection unit 211 selects one from "0" and the calculation result obtained by the high altitude rotation speed calculation unit 210 as the rotation speed of the engine 11 that drives the generator 12 based on the determination result obtained by the high altitude determination unit 202, and supplies the selected value to the maximum value selection unit 212. Specifically, the rotation speed selection unit 211 selects the calculation result obtained by the high altitude rotation speed calculation unit 210 when it is determined that the vehicle is present at a high altitude, and selects "0" when it is not determined that the vehicle is present at a high altitude.

The maximum value selection unit 212 selects a larger value from the value selected by the minimum value selection unit 209 and the value selected by the rotation speed selection unit 211, and outputs the selected value to the engine 11. That is, the rotation speed of the engine 11 is controlled based on the value selected by the maximum value selection unit 212.

[Examples of Normal State Charge/Discharge Map and High Altitude Charge/Discharge Map]

Figure 2A:
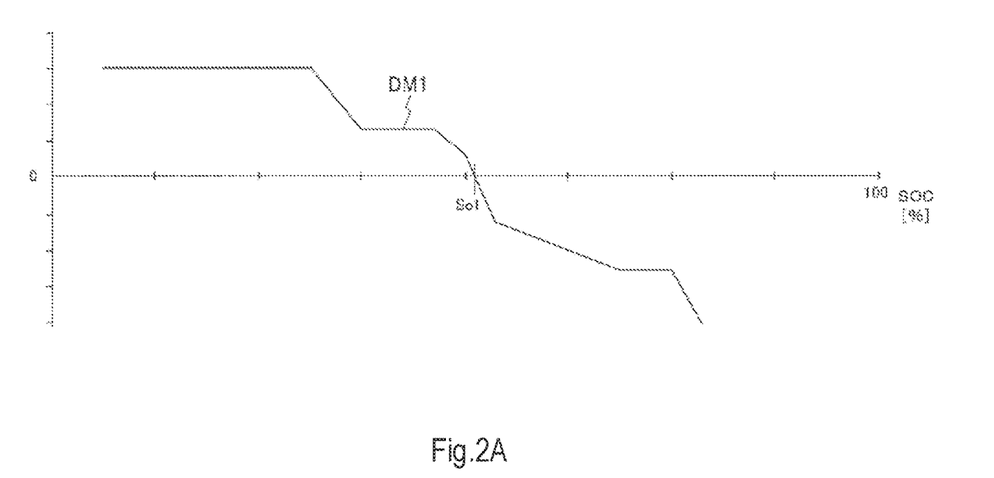
FIG. 2A is a diagram illustrating an example of a normal state charge/discharge map.
Figure 2B:
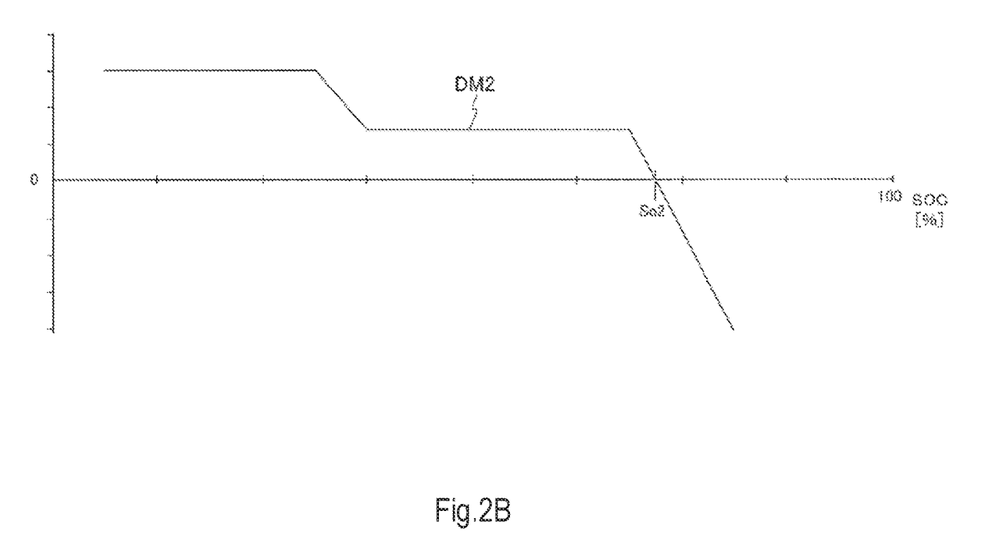
FIG. 2B is a diagram illustrating an example of a high altitude charge/discharge map.

FIG. 2A is a diagram illustrating an example of a normal state charge/discharge map. FIG. 2B is a diagram illustrating an example of a high altitude charge/discharge map. In FIGS. 2A and 2B, the vertical axis represents an additional charge amount "kW" of the battery 13, and the horizontal axis represents states of charge (SOC) "%". Here, the additional charge amount means an amount of electric power to be charged in the battery 13 among the electric power generated by the generator 12. For example, when the value of the additional charge amount is a positive value, charging is performed, and when the value of the additional charge amount is a negative value, discharging is performed. That is, in the case of discharging, the electric motor 14 is driven by using the electric power of the battery 13. In addition, FIGS. 2A and 2B illustrate examples in which a lower limit value of the additional charge amount of the battery 13 is controlled. That is, FIG. 2A illustrates an example of a lower limit line of the additional charge amount in a normal state, and FIG. 2B illustrates an example of a lower limit line of the additional charge amount at a high altitude.

Regarding the charge/discharge map, although a plurality of maps are held in accordance with the vehicle speed, FIGS. 2A and 2B illustrate an example of a map when the vehicle speed is V1 (kilometer per hour (kph)) for ease of description. V1 is, for example, a vehicle speed at the time of high speed traveling.

As illustrated in FIG. 1, the addition unit 206 adds the value of the power conversion unit 201 (power value corresponding to the torque command value of the electric motor 14) and the value of the charge/discharge map illustrated in FIG. 2A or FIG. 2B. In this case, the normal state charge/discharge map illustrated in FIG. 2A is used when it is not determined that the vehicle is present at a high altitude (normal state), and the high altitude charge/discharge map illustrated in FIG. 2B is used when it is determined that the vehicle is present at a high altitude. In addition, based on the information from the battery 13, the value of the additional charge amount "kW" (vertical axis) corresponding to the current SOC of the battery 13 is to be added.

As illustrated in FIG. 2A, in a case where it is not determined that the vehicle is present at a high altitude (normal state) and the vehicle speed is V1, when the SOC is less than So1, the additional charge amount "kW" becomes a positive value. In addition, in the case where the vehicle is in the normal state and the vehicle speed is V1, when the SOC becomes So1 or more, the additional charge amount "kW" becomes a negative value. In this way, in the case where the vehicle is in the normal state and the vehicle speed is V1, the SOC of the battery 13 is set to be at least So1 or more.

As illustrated in FIG. 2B, in a case where it is determined that the vehicle is present at a high altitude and the vehicle speed is V1, when the SOC is less than So2, the additional charge amount "kW" becomes a positive value. In addition, in the case where it is determined that the vehicle is present at a high altitude and the vehicle speed is V1, when the SOC becomes So2 or more, the additional charge amount "kW" becomes a negative value. In this way, in the case where it is determined that the vehicle is present at a high altitude and the vehicle speed is V1, the SOC of the battery 13 is set to be at least So2 or more.

Here, as illustrated in FIGS. 2A and 2B, So1 is a value smaller than So2. That is, the SOC at which the additional charge amount illustrated in FIG. 2A (vertical axis of FIG. 2A) is 0 kW is smaller than the SOC at which the additional charge amount illustrated in FIG. 2B (vertical axis of FIG. 2B) is 0 kW. In the present embodiment, the SOC (So1 illustrated in FIG. 2A and So2 illustrated in FIG. 2B) at which the additional charge amount illustrated in FIGS. 2A and 2B is 0 kW will be referred to as an "SOC center". The SOC center (So1 and So2) can be set using various types of experimental data such as performances of the battery, the engine, and the generator.

In the present embodiment, an example in which only the lower limit value of the additional charge amount of the battery 13 is controlled is described, but the upper limit value of the additional charge amount of the battery 13 may be controlled. In addition, in the present embodiment, an example in which control is performed in two stages corresponding to whether it is determined that the vehicle is present at a high altitude is described, but the control may be performed in three or more stages corresponding to the elevation of the vehicle 1.

[Example of Limitation of Driving Force]

FIGS. 3A to 3D illustrate examples of limitations of the driving force when a high altitude determination threshold TH1 is used as a reference. In FIGS. 3A to 3D, each relation is illustrated in a simplified manner for ease of description.

Figure 3A:
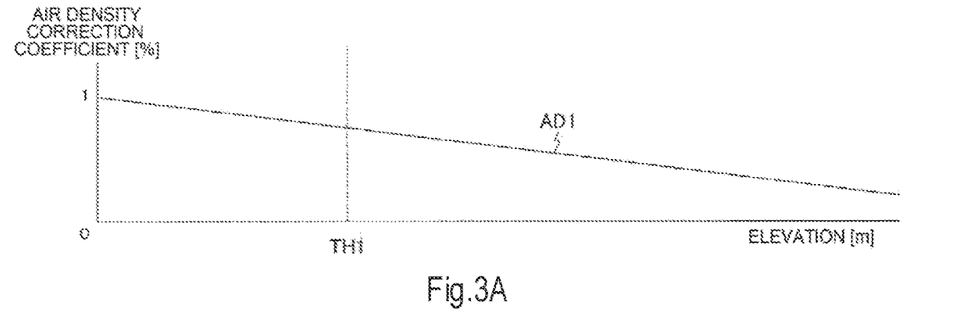
FIG. 3A is a diagram illustrating an example of a relation between an air density correction coefficient and an elevation.

FIG. 3A is a diagram illustrating an example of a relation between an air density correction coefficient and an elevation [m]. The air density can be obtained based on the atmospheric pressure and the temperature. In addition, the elevation can be determined based on the air density. In FIG. 3A, for ease of description, the relation between the air density correction coefficient and the elevation [m] is simplified by a straight line AD1.

The air density correction coefficient is a value indicating a ratio of an air amount that can be taken in by the engine 11 when a case, where the elevation of the vehicle 1 is 0 m, is set as "1". For example, when the engine 11 having a maximum output of 100 kw is taken as an example, an engine output of 100 kw is possible when the air density correction coefficient is 1, and an engine output of 90 kw is possible when the air density correction coefficient is 0.9. That is, as indicated by the straight line AD1, the value of the air density correction coefficient decreases as the elevation of the vehicle 1 increases.

As described above, in the first embodiment, an example in which it is determined that the vehicle is present at a high altitude when the vehicle 1 reaches the elevation TH1, for example, 2,800 m, is described. That is, an example in which the elevation TH1 is set as the high altitude determination threshold TH1 is described. The high altitude determination threshold TH1 can be set using various types of experimental data such as the performances of the battery, the engine, and the generator corresponding to the elevation.

As described above, it is possible to provide the high altitude determination threshold TH1 for the air density, determine whether the vehicle is present at a high altitude, and perform control related to limiting the driving force of the electric motor 14 at the high altitude and ensuring the SOC of the battery 13.

Figure 3B:
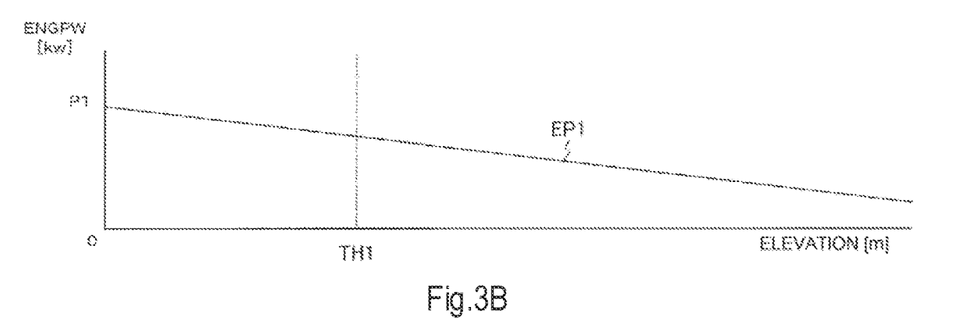
FIG. 3B is a diagram illustrating an example of a relation between an engine output and the elevation.

FIG. 3B is a diagram illustrating an example of a relation between an engine output [kw] and the elevation [m]. In FIG. 3B, for ease of description, the relation between the engine output [kw] and the elevation [m] is simplified by a straight line EP1.

As described above, an engine output corresponding to the elevation can be obtained by multiplying the maximum output of the engine 11 by the air density correction coefficient illustrated in FIG. 3A. That is, the engine output decreases as the elevation increases.

Figure 3C:
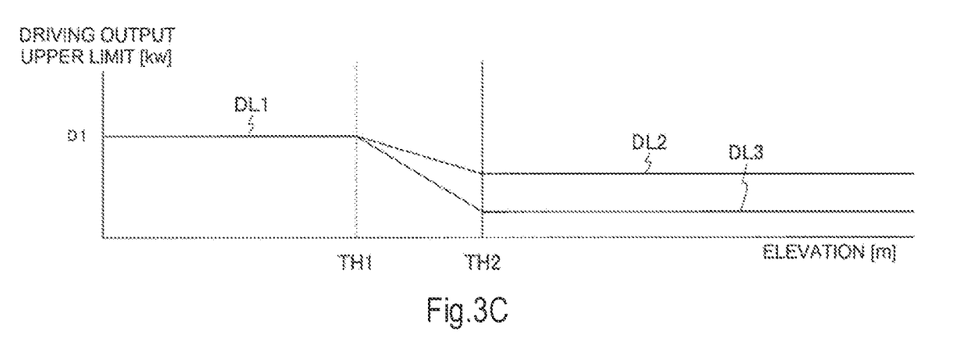
FIG. 3C is a diagram illustrating an example of a relation between a driving output upper limit of an electric motor and the elevation.

FIG. 3C is a diagram illustrating an example of a relation between a driving output upper limit [kw] of the electric motor 14 and the elevation [m].

As indicated by a line DL1 in FIG. 3C, when the elevation of the vehicle 1 is less than the high altitude determination threshold TH1, the driving force of the electric motor 14 is not limited. That is, a minimum value of driving forces obtained by the target driving force calculation unit 101 and the torque conversion unit 102 is set as the driving force of the electric motor 14.

As indicated by a line DL3 in FIG. 3C, when the elevation of the vehicle 1 exceeds the high altitude determination threshold TH1, the upper limit value of the driving force of the electric motor 14 is limited. A limit amount thereof is gradually increased until the elevation of the vehicle 1 exceeds the high altitude determination threshold TH1 and reaches a threshold TH2 (here, TH1<TH2). In addition, when the elevation of the vehicle 1 exceeds the threshold TH2, the limit amount thereof is set to be constant. As described above, by limiting the upper limit value of the driving force of the electric motor 14, it is possible to prevent the SOC of the battery 13 from being excessively used.

Here, when the driver depresses the accelerator with an intention of acceleration, the kickdown switch is turned on. In this case, when the upper limit value of the driving force of the electric motor 14 is limited, the driver may not be able to obtain an intended acceleration feeling, and the driver may feel uncomfortable. Therefore, even in a case where the elevation of the vehicle 1 exceeds the high altitude determination threshold TH1, when the kickdown switch is turned on, the limitation of the driving force of the electric motor 14 is relaxed as indicated by a line DL2 in FIG. 3C.

In this way, when the kickdown switch is turned on, the driving force is limited by a driving force for kickdown pedaling. As a result, it is possible to reflect the intention of acceleration of the driver even at a high altitude. In addition, it is possible to determine the intention of acceleration of the driver using an existing kickdown switch, and use the determination result thereof for the control related to limiting the driving force of the electric motor 14.

As described above, in the first embodiment, when the elevation of the vehicle 1 exceeds the high altitude determination threshold TH1, the limit amount of the driving force of the electric motor 14 is set as indicated by the line DL3. However, when the kickdown switch is turned on, the limit amount of the driving force of the electric motor 14 is set based on the turn-on operation of the kickdown switch (example of the acceleration operation of the vehicle 1) as indicated by the line DL2.

Figure 3D:
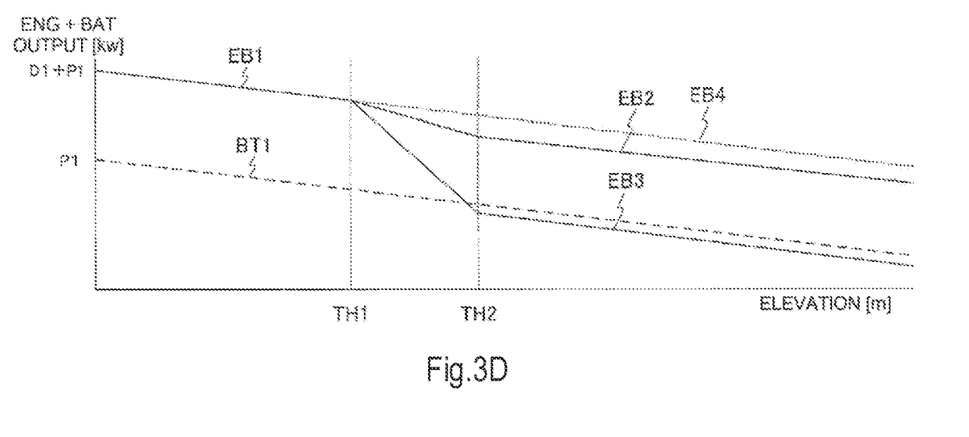
FIG. 3D is a diagram illustrating an example of a relation between the elevation and a total value of the engine output and a battery output.

FIG. 3D is a diagram illustrating an example of a relation between the elevation [m] and a total value [kw] of the engine output and a battery output. The vertical axis in FIG. 3D indicates an output that can be used in driving the vehicle 1. That is, an example of a relation in a case where information on outputs of the engine 11 and the battery 13 is viewed on a power axis is illustrated.

A straight line EB1 illustrated in FIG. 3D indicates a value obtained by adding the value of the straight line EP1 illustrated in FIG. 3B and the value of the line DL1 illustrated in FIG. 3C. Similarly, a line EB2 illustrated in FIG. 3D indicates a value obtained by adding the value of the straight line EP1 illustrated in FIG. 3B and the value of the line DL2 illustrated in FIG. 3C. Similarly, a line EB3 illustrated in FIG. 3D indicates a value obtained by adding the value of the straight line EP1 illustrated in FIG. 3B and the value of the line DL3 illustrated in FIG. 3C.

In addition, a dotted line EB4 illustrated in FIG. 3D indicates a value in a case where it is assumed that the limitation illustrated in FIG. 3C (limitation of the upper limit value of the driving force of the electric motor 14) is not performed when the elevation of the vehicle 1 exceeds the high altitude determination threshold TH1.

A dotted line BT1 illustrated in FIG. 3D indicates an amount of electric power generated by the engine output corresponding to the straight line EP1 in FIG. 3B. In FIG. 3D, as indicated by a relation between the dotted line BT1 and the line EB3, when the elevation of the vehicle 1 exceeds the high altitude determination threshold TH1 and further reaches the vicinity of the threshold TH2, the value of the line EB3 becomes smaller than the value of the dotted line BT1. That is, by limiting the upper limit value of the driving force of the electric motor 14, an amount of electric power that is not used for driving the electric motor 14 among the electric power that can be generated by the engine output is generated. That is, a reserve charging capacity is generated. Therefore, when the elevation of the vehicle 1 exceeds the threshold TH2 and the kickdown switch is not turned on, the battery 13 can be charged with the electric power generated by the engine output, and exhaustion of the battery 13 can be prevented. The exhaustion of the battery 13 means that the SOC of the battery 13 is less than a predetermined value. For example, when the SOC of the battery 13 is less than 40%, it is determined that the SOC of the battery 13 is exhausted.

As described above, when the elevation of the vehicle 1 exceeds the high altitude determination threshold TH1 and further exceeds the threshold TH2, the battery 13 can be charged by setting the line EB3 to be lower than the dotted line BT1, and thus the SOC of the battery 13 can be prevented from being exhausted. However, when the upper limit value of the driving force of the electric motor 14 is limited such that the line EB3 is lower than the dotted line BT1 immediately after the elevation of the vehicle 1 exceeds the high altitude determination threshold TH1, the driver may feel uncomfortable due to a rapid change in the driving force. Therefore, until the elevation of the vehicle 1 exceeds the high altitude determination threshold TH1 and reaches the threshold TH2, the upper limit value of the driving force of the electric motor 14 is gradually limited in accordance with the elevation of the vehicle 1 as indicated by the line EB3 in FIG. 3D. When the elevation of the vehicle 1 exceeds the threshold TH2, the upper limit value of the driving force of the electric motor 14 is limited such that the line EB3 is lower than the dotted line BT1.

Here, for example, in a case where the vehicle is traveling on an expressway in a state where the engine output is reduced at a high altitude, when an output supply from the battery 13 to the electric motor 14 is performed without limitation in accordance with a depression amount of the accelerator pedal by the driver, the battery 13 may be exhausted immediately. That is, when a driving output is performed without limitation even though the engine output is reduced at a high altitude, the SOC of the battery 13 may be exhausted immediately. In this way, when the battery 13 is exhausted, it is necessary to cover the output of the electric motor 14 only by the electric power generated by the engine 11, and thus it is necessary to significantly limit the driving force of the electric motor 14, which leads to a feeling of insufficient acceleration. For example, when such a limitation occurs on an expressway, the driver may feel dissatisfaction.

Therefore, in the first embodiment, the upper limit value of the driving force of the electric motor 14 is limited based on the high altitude determination threshold TH1. When the elevation of the vehicle 1 exceeds the high altitude determination threshold TH1, setting is made such that the reserve charging capacity is generated with reference to the vicinity of the threshold TH2. That is, when the elevation of the vehicle 1 is from the high altitude determination threshold TH1 to the vicinity of the threshold TH2, the setting is made such that the reserve charging capacity is not generated, and when the elevation of the vehicle 1 exceeds the threshold TH2, the setting is made such that the reserve charging capacity is generated. As described above, in the first embodiment, the control of the driving force of the electric motor 14 and the control of the reserve charging capacity of the battery 13 are changed based on the high altitude determination threshold TH1 and the threshold TH2.

As described above, in the first embodiment, the SOC center of the battery 13 can be shifted to a high level at a high altitude. Specifically, a high altitude charge/discharge map is prepared, and when it is determined that the vehicle is present at a high altitude, the charge/discharge map is switched to the high altitude charge/discharge map. That is, a target value of the SOC of the battery 13 is switched from a value for the level ground to a value for the high altitude for use.

In addition, in order to ensure the electric power generated by the battery 13, when it is determined that the vehicle is present at a high altitude, the rotation speed for high altitude and the α-line rotation speed for high altitude are calculated, and the rotation speed required for the high altitude can be indicated. As described above, in the first embodiment, when it is determined that the vehicle is present at a high altitude, the driving force of the electric motor 14 is limited, and the SOC center of the battery 13 is shifted to a high level, and thus it is possible to ensure an SOC that can withstand the intention of acceleration at a high altitude.

In FIG. 3D, as indicated by the relation between the dotted line BT1 and the line EB2, even when the elevation of the vehicle 1 exceeds the threshold TH2, the value of the line EB2 is larger than the value of the dotted line BT1. That is, when the limitation of the upper limit value of the driving force of the electric motor 14 is relaxed, the electric power of the battery 13 may be required for driving the electric motor 14 in addition to the electric power generated by the engine output. When such a state continues, the battery 13 may be exhausted. However, when the kickdown switch is not turned on, the driving force of the electric motor 14 is limited, so that when the limitation is continued until the driver intends to accelerate the vehicle, the driver may have a feeling of insufficient acceleration. Therefore, when the kickdown switch is turned on, the control as indicated by the line EB2 is executed.

[Example of Limitation of Driving Force Corresponding to Vehicle Speed]

Figure 4:
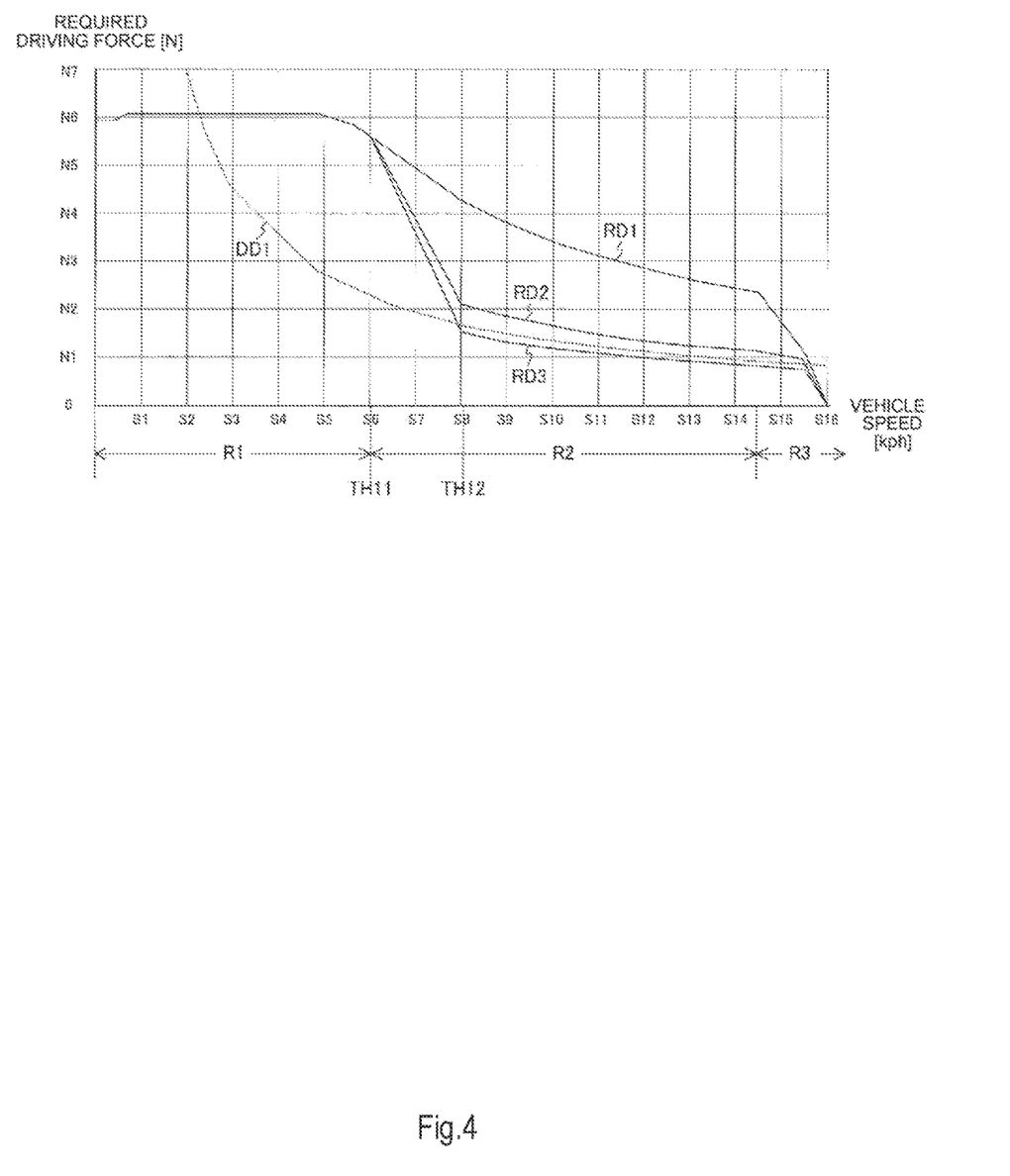
FIG. 4 is a diagram illustrating an example of a relation between a required driving force and a vehicle speed.

FIG. 4 is a diagram illustrating an example of a relation between a required driving force and a vehicle speed. In FIG. 4, the vertical axis represents the required driving force "N", and the horizontal axis represents the vehicle speed "kph". Here, since the vehicle speed and the rotation speed of the electric motor 14 have a proportional relation, the example of the relation between the required driving force and the vehicle speed illustrated in FIG. 4 can also be understood as an example of a relation between the required driving force and the rotation speed of the electric motor 14.

A line RD1 indicates an example of a relation between the required driving force and the vehicle speed in an environment in which it is not determined that the vehicle is present at a high altitude. Here, in a low rotation speed region R1 in which the rotation speed of the electric motor 14 is equal to or lower than a first rotation speed NR1, the required driving force takes a substantially constant value with respect to a change in the rotation speed of the electric motor 14. Therefore, the region R1 can be referred to as a motor torque constant region.

In a middle rotation speed region R2 in which the rotation speed of the electric motor 14 is between the first rotation speed NR1 and a second rotation speed NR2 (here, NR1<NR2), the output of the electric motor 14 takes a substantially constant value with respect to the change in the rotation speed of the electric motor 14. Therefore, the region R2 can be referred to as a motor output constant region.

In a region R3 in which the rotation speed of the electric motor 14 exceeds the second rotation speed NR2, the required driving force and the output of the electric motor 14 rapidly decrease with respect to the change in the rotation speed of the electric motor 14. That is, the second rotation speed NR2 corresponds to an upper limit rotation speed at which the electric motor 14 can exhibit a practical performance.

A line RD3 indicates an example of a relation between the required driving force and the vehicle speed when the elevation of the vehicle 1 is the high altitude determination threshold TH1. A line RD2 indicates an example of a relation between the required driving force and the vehicle speed when the kickdown switch is turned on in a case where the elevation of the vehicle 1 is the high altitude determination threshold TH1.

As illustrated in FIG. 4, until the vehicle speed reaches S6, the driving force is not limited regardless of whether it is determined that the vehicle is present at a high altitude. For example, a series hybrid vehicle can provide a comfortable acceleration feeling. In addition, it is considered that a frequency of depression of the accelerator pedal is often low on an expressway, and the frequency of depression of the accelerator pedal is relatively high in an urban area. In this way, when the vehicle travels at a vehicle speed less than S6, such as in an urban area or the like, appropriate acceleration is often required. Therefore, in an urban area or the like where the vehicle is assumed to travel at a relatively low speed, the driving force is set not to be limited in order to take advantage of characteristics of the series hybrid vehicle. That is, normal control is performed in the urban area where the vehicle speed is lower than a predetermined vehicle speed.

When the vehicle speed exceeds S6, the driving force is limited when it is determined that the vehicle is present at a high altitude. In FIG. 4, S6 is indicated as a vehicle speed threshold TH11, and S8 is indicated as a vehicle speed threshold TH12. S6 is a vehicle speed when the vehicle travels in an urban area or the like, and S8 is a value higher than S6 by about several tens of (kph). S6 and S8 can be set using various types of experimental data such as the performances of the battery, the engine, and the generator corresponding to the elevation and the vehicle speed.

That is, in the motor torque constant region R1, the driving force is not limited regardless of whether it is determined that the vehicle is present at a high altitude. In addition, in the motor output constant region R2, the driving force is limited when it is determined that the vehicle is present at a high altitude.

A dotted line DD1 indicates a limit value of the driving force of the electric motor 14 when it is determined that the SOC of the battery 13 is exhausted in a case where the elevation of the vehicle 1 is the high altitude determination threshold TH1. That is, the dotted line DD1 indicates a driving force when the electric motor 14 is driven using only the electric power generated by the engine output in a case where the SOC of the battery 13 is determined to be exhausted and the electric power of the battery 13 cannot be used.

In the example illustrated in FIG. 4, even when the SOC of the battery 13 is determined to be exhausted in a case where the elevation of the vehicle 1 is the high altitude determination threshold TH1, it is possible to ensure the driving force of the electric motor 14 up to the value of the dotted line DD1. In addition, by setting the relation between the required driving force and the vehicle speed of the vehicle 1 to be lower than the dotted line DD1, it is possible to charge the battery 13 with the electric power generated by the engine output.

As described above, in the first embodiment, when the elevation of the vehicle 1 is the high altitude determination threshold TH1, the driving force of the electric motor 14 is limited based on the electric power generated by the engine 11 under the environment thereof. In other words, the driving force of the electric motor 14 is limited such that the electric power generated by the engine 11 under the environment becomes larger than the required electric power of the electric motor 14.

As described above, when the elevation of the vehicle 1 is the high altitude determination threshold TH1, the battery 13 can be charged by setting the relation between the required driving force and the vehicle speed of the vehicle 1 to be lower than the dotted line DD1, and thus the SOC of the battery 13 can be prevented from being exhausted. However, when the driving force of the electric motor 14 is limited such that the relation is lower than the dotted line DD1 immediately after the vehicle speed exceeds the vehicle speed threshold TH11, the driver may feel uncomfortable due to a rapid change in the driving force. Therefore, until the vehicle speed exceeds the vehicle speed threshold TH11 and reaches the vehicle speed threshold TH12, the driving force of the electric motor 14 is gradually limited in accordance with an increase in the vehicle speed as indicated by the line RD3 in FIG. 4. When the vehicle speed exceeds the vehicle speed threshold TH12, the driving force of the electric motor 14 is limited such that the line RD3 is lower than the dotted line DD1.

However, in a case where the kickdown switch is turned on, even when the vehicle speed exceeds the vehicle speed threshold TH12, the limitation of the driving force of the electric motor 14 is relaxed as indicated by the line RD2.

As described above, in the first embodiment, when the elevation of the vehicle 1 exceeds the high altitude determination threshold TH1, the limit amount of the driving force of the electric motor 14 is set based on the vehicle speed of the vehicle 1 as indicated by the lines RD2 and RD3. As indicated by the line RD2, the limit amount of the driving force of the electric motor 14 is set based on the vehicle speed of the vehicle 1 and the acceleration operation (turn-on operation of the kickdown switch) of the vehicle 1.

[Example of Operation of Control Device]

Figure 5:
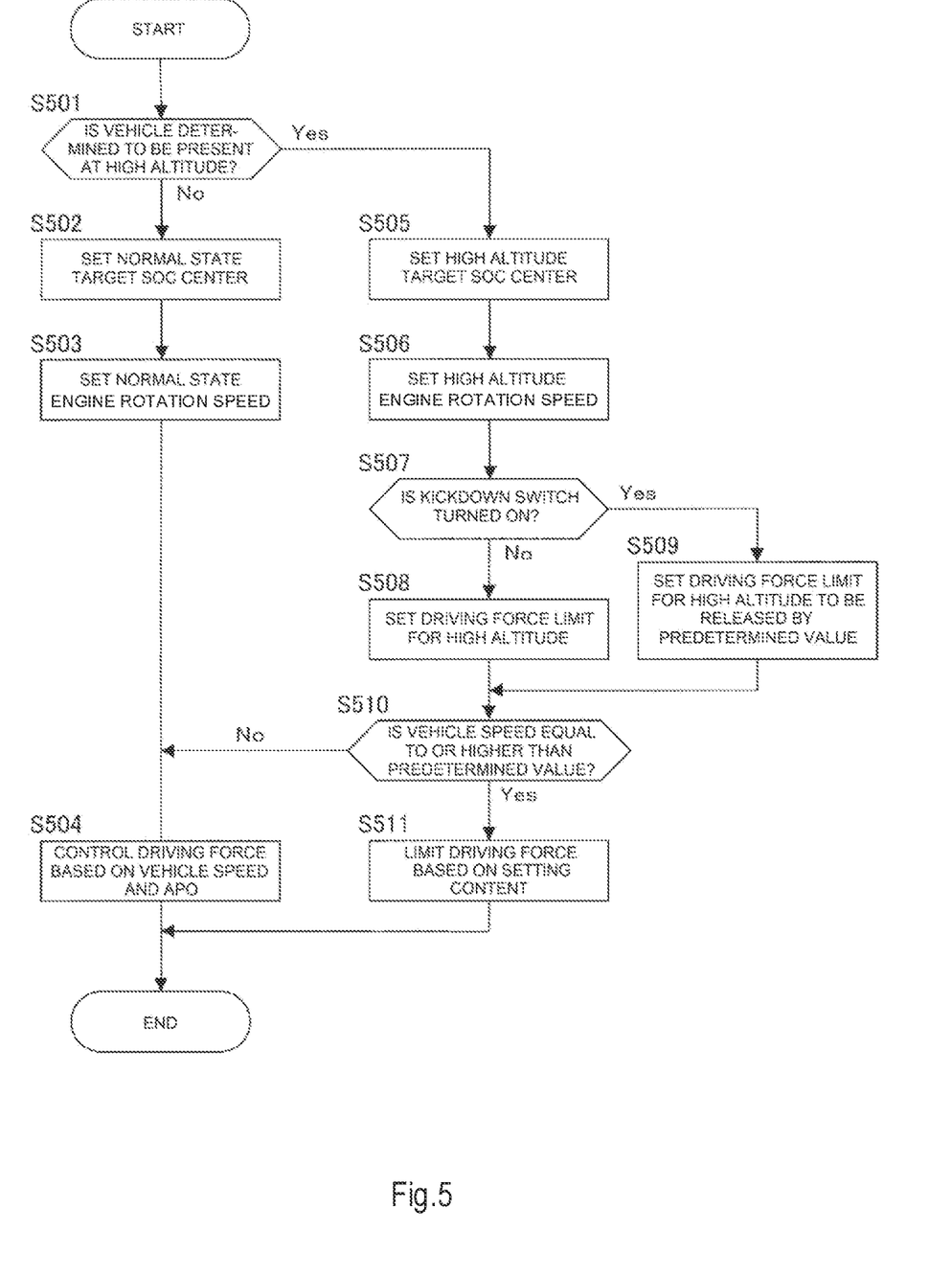
FIG. 5 is a flowchart illustrating an example of a processing procedure of a vehicle control process executed by a system for controlling a vehicle.

FIG. 5 is a flowchart illustrating an example of a processing procedure of a vehicle control process executed by a system for controlling the vehicle 1. The processing procedure is executed based on a program stored in a storage unit (not illustrated) of the system for controlling the vehicle 1.

In step S501, the high altitude determination unit 103 and the high altitude determination unit 202 perform high altitude determination. When it is determined that the vehicle is present at a high altitude, the process proceeds to step S505, and when it is determined that the vehicle is not at a high altitude, the process proceeds to step S502.

In step S502, the power generation system controller 200 sets a normal state target SOC center. Specifically, the map selection unit 205 selects the normal state charge/discharge map held in the normal state charge/discharge map holding unit 203, and charging/discharging of the battery 13 is set based on the normal state charge/discharge map. The normal state target SOC center means an SOC center which is a target (SOC at which the additional charge amount becomes 0 kW) in the normal state.

In step S503, the power generation system controller 200 sets a normal state engine rotation speed. Specifically, the α-line rotation speed calculation unit 208 calculates an α-line rotation speed based on the normal state charge/discharge map. In addition, the rotation speed selection unit 211 selects "0". Then, the maximum value selection unit 212 selects a value selected by the minimum value selection unit 209 (the smaller value of the α-line rotation speed based on the normal state charge/discharge map and the optimum rotation speed corresponding to the vehicle speed of the vehicle 1) as the engine rotation speed.

In step S504, the drive system controller 100 outputs an instruction for controlling the driving force of the vehicle 1 to the inverter 15 based on a value selected by the selection unit 106. Since it is not determined that the vehicle is present at a high altitude, the selection unit 106 selects the minimum value of the driving forces obtained by the target driving force calculation unit 101 and the torque conversion unit 102.

In step S505, the power generation system controller 200 sets a high altitude target SOC center. Specifically, the map selection unit 205 selects the high altitude charge/discharge map held in the high altitude charge/discharge map holding unit 204, and the charging/discharging of the battery 13 is set based on the high altitude charge/discharge map. The high altitude target SOC center means an SOC center which is a target (SOC at which the additional charge amount becomes 0 kW) when it is determined that the vehicle is present at a high altitude. As described above, in the first embodiment, when it is determined that the vehicle is present at a high altitude, the target SOC center of the battery 13 is set to a larger value than that before it is determined that the vehicle is present at a high altitude.

In step S506, the power generation system controller 200 sets a high altitude engine rotation speed. Specifically, the α-line rotation speed calculation unit 208 calculates the α-line rotation speed based on the high altitude charge/discharge map. The minimum value selection unit 209 selects a smaller value from the α-line rotation speed based on the high altitude charge/discharge map and the optimum rotation speed corresponding to the vehicle speed of the vehicle 1. In addition, the rotation speed selection unit 211 selects a rotation speed of the engine 11 for high altitude calculated by the high altitude rotation speed calculation unit 210. Then, the maximum value selection unit 212 selects a larger value from the value selected by the minimum value selection unit 209 and the value selected by the rotation speed selection unit 211 (rotation speed of the engine 11 for high altitude) as the engine rotation speed.

In step S507, the K/D determination unit 104 performs K/D determination to determine whether the kickdown switch is turned on. When the kickdown switch is turned on, the process proceeds to step S509, and when the kickdown switch is not turned on, the process proceeds to step S508.

In step S508, the driving torque limiting unit 105 sets a limit value of the driving force for high altitude. Specifically, the limit value of the driving force for high altitude is set as indicated by the line DL3 in FIG. 3C and the line RD3 in FIG. 4.

In step S509, the driving torque limiting unit 105 sets a driving force limit for high altitude to be released by a predetermined value. Specifically, the limit value of the driving force for high altitude when the kickdown switch is turned on is set as indicated by the line DL2 in FIG. 3C and the line RD2 in FIG. 4.

In step S510, the selection unit 106 performs vehicle speed determination to determine whether the vehicle speed is equal to or higher than a predetermined value. When the vehicle speed is equal to or higher than the predetermined value, the selection unit 106 selects the limit value of the driving force for high altitude set by the driving torque limiting unit 105 in step S508 or S509, and the process proceeds to step S508. However, when the value set by the driving torque limiting unit 105 is larger than the value obtained by the target driving force calculation unit 101 or the torque conversion unit 102, a minimum value of the driving forces obtained by the target driving force calculation unit 101 and the torque conversion unit 102 is selected. On the other hand, when the vehicle speed is less than the predetermined value, the selection unit 106 selects the minimum value of the driving forces obtained by the target driving force calculation unit 101 and the torque conversion unit 102, and the process proceeds to step S504.

That is, when the vehicle speed is less than the predetermined value, for example, S6 (kph) illustrated in FIG. 4, the driving force is not limited even when it is determined that the vehicle is present at a high altitude. However, regardless of whether the vehicle speed is less than the predetermined value, when it is determined that the vehicle is present at a high altitude, the high altitude target SOC center is set, and the high altitude engine rotation speed is set.

In step S511, the drive system controller 100 outputs an instruction for controlling the driving force of the vehicle 1 to the inverter 15 based on the value selected by the selection unit 106.

Here, a technique of executing control for limiting the driving force of the vehicle after the SOC of the battery decreases is assumed. In this technique, electric power generated by the engine is used to increase the SOC of the battery after the SOC of the battery has decreased. In this way, since a part of the electric power generated by the engine is used to increase the SOC of the battery, the electric power to be used as the driving force when driving the electric motor is limited. That is, in order to increase the SOC of the battery, the driving force of the vehicle is further limited. In this way, when the driving force of the vehicle is significantly limited, the driving force of the vehicle greatly differs before and after the SOC of the battery decreases, and thus the driver may feel dissatisfaction.

On the other hand, in the first embodiment, when it is determined that the vehicle is present at a high altitude, the control for limiting the driving force of the vehicle 1 is executed even in a state where the SOC of the battery 13 does not decrease. That is, when it is determined that the vehicle is present at a high altitude, the control for limiting the driving force of the vehicle 1 is executed regardless of the SOC of the battery 13. As a result, a distance over which the vehicle can travel at a high output can be extended. That is, since the driving force of the vehicle 1 is limited even in a state where the SOC of the battery 13 is large, the decrease in the SOC of the battery 13 can be made more gradual than in the above-described technique. Accordingly, a time until the vehicle gets into a low SOC state in which the driving force of the vehicle 1 is significantly limited can be extended, and the distance (time) over which the vehicle 1 can travel at a high output can be extended.

In the first embodiment, when it is determined that the vehicle is present at a high altitude and there is no intention of acceleration (that is, when the kickdown switch is not turned on), the driving force of the electric motor 14 is limited. On the other hand, when it is determined that the vehicle is present at a high altitude and there is an intention of acceleration (that is, when the kickdown switch is turned on), the limitation of the driving force of the electric motor 14 is relaxed. In this way, while responding to the intention of acceleration of the driver, it is possible to extend the time until the vehicle gets into the low SOC state in which the driving force of the vehicle 1 is significantly limited, and it is possible to extend the distance (time) over which the vehicle 1 can travel at a high output.

As described above, according to the first embodiment, in a case where the vehicle 1 is present at a high altitude, the driving force of the electric motor 14 can be limited in accordance with a decrease in the engine output. The SOC of the battery 13 can be maintained by limiting the driving force of the electric motor 14. The SOC center of the battery 13 can be shifted to a higher level by switching to the high altitude charge/discharge map or by calculating the high altitude engine rotation speed. In addition, whether the driver has an intention of acceleration is determined, and when the driver has the intention of acceleration, the limitation of the driving force of the electric motor 14 can be relaxed. Thus, when the vehicle 1 is present at a high altitude, it is possible to perform control such that a minimum vehicle speed continues for a long time by depressing the accelerator pedal while preventing a decrease in the SOC of the battery 13.

As described above, according to the first embodiment, even in an environment in which the output of the engine 11 is limited, a decrease in the SOC of the battery 13 can be prevented and the travel distance of the vehicle 1 can be extended.

[Operation and Effect of First Embodiment]

The method for controlling a vehicle according to the first embodiment is a method for controlling the vehicle 1, the vehicle 1 includes the electric motor 14 that drives the vehicle 1, the engine 11 that drives the generator 12 that generates electric power to be supplied to the electric motor 14, and the battery 13 that is chargeable by the generator 12 and electrically connected to the electric motor 14. This control method includes a control step (steps S505 to S511) of limiting the driving force of the electric motor 14 when the vehicle 1 is traveling in an environment in which the output of the engine 11 is limited.

According to such a method for controlling a vehicle, the driving force of the electric motor 14 is limited in accordance with a decrease in the engine output at a high altitude, so that a decrease in the SOC of the battery 13 can be prevented and the travel distance of the vehicle 1 can be extended.

In the method for controlling a vehicle according to the first embodiment, in the control step (steps S510 and S511), when the vehicle 1 is traveling in the environment in which the output of the engine 11 is limited, the limit amount of the driving force of the electric motor 14 is set based on the vehicle speed of the vehicle 1.

According to such a method for controlling a vehicle, the driving force of the electric motor 14 can be adjusted based on the vehicle speed of the vehicle 1, and a comfortable operation environment can be provided to the driver.

In the method for controlling a vehicle according to the first embodiment, in the control step (steps S510 and S511), in a case where the vehicle 1 is traveling in the environment in which the output of the engine 11 is limited, the driving force of the electric motor 14 is limited when the vehicle speed of the vehicle 1 is higher than a predetermined value (for example, S6 (kph) illustrated in FIG. 4), and the driving force of the electric motor 14 is not limited when the vehicle speed of the vehicle 1 is lower than the predetermined value.

According to such a method for controlling a vehicle, the driving force of the electric motor 14 is not limited in an urban area or the like where the vehicle is assumed to travel at a low speed, and the driving force of the electric motor 14 is limited on an expressway or the like where the vehicle is assumed to travel at a high speed. In this way, the driving force of the electric motor 14 can be adjusted based on the vehicle speed of the vehicle 1.

In the method for controlling a vehicle according to the first embodiment, in the control step (steps S507 and S509), in a case where the vehicle 1 travels in the environment in which the output of the engine 11 is limited and the vehicle speed of the vehicle 1 is higher than the predetermined value, when a turn-on operation (example of a predetermined acceleration operation) of the kickdown switch is performed, the limitation of the driving force of the electric motor 14 is relaxed.

According to such a method for controlling a vehicle, whether the driver has an intention of acceleration can be determined, and the driving force of the electric motor 14 can be adjusted based on the intention of acceleration of the driver and the vehicle speed.

In the method for controlling a vehicle according to the first embodiment, in the control step (steps S507 and S509), when the vehicle 1 is traveling in the environment in which the output of the engine 11 is limited, the limit amount of the driving force of the electric motor 14 is set based on the turn-on operation (example of the predetermined acceleration operation) of the kickdown switch of the vehicle 1.

According to such a method for controlling a vehicle, whether the driver has an intention of acceleration can be determined, and the driving force of the electric motor 14 can be adjusted.

In the method for controlling a vehicle according to the first embodiment, in the control step (steps S507 to S511), when the vehicle 1 is traveling in the environment in which the output of the engine 11 is limited, the limit amount of the driving force of the electric motor 14 is set based on the vehicle speed of the vehicle 1 and the acceleration operation of the vehicle 1.

According to such a method for controlling a vehicle, whether the driver has an intention of acceleration can be determined, and the driving force of the electric motor 14 can be adjusted based on the intention of acceleration of the driver and the vehicle speed.

In the method for controlling a vehicle according to the first embodiment, in the control step (step S505), when the vehicle 1 is traveling in the environment in which the output of the engine 11 is limited, the SOC at which the additional charge amount of the battery 13 becomes 0 kW is set to a larger value than that before the vehicle 1 travels in the environment. That is, the target SOC center of the battery 13 is set to be higher than that before the vehicle 1 travels in the environment. The SOC at which the additional charge amount of the battery 13 becomes 0 kW includes So1 illustrated in FIG. 2A and So2 illustrated in FIG. 2B, and is also referred to as an SOC center.

According to such a method for controlling a vehicle, in order to prevent the SOC exhaustion of the battery 13 at a high altitude, the driving force of the electric motor 14 is limited and the SOC center of the battery 13 is controlled to be high at the same time in accordance with a decrease in the engine output at a high altitude.

In the method for controlling a vehicle according to the first embodiment, in the control step (step S508), when the vehicle 1 is traveling in the environment in which the output of the engine 11 is limited, the driving force of the electric motor 14 is limited based on the electric power generated by the engine 11 under the environment.

According to such a method for controlling a vehicle, since the amount of electric power generated by the engine 11 decreases at a high altitude, by setting an output value of the electric motor 14 based on a maximum output value of the engine 11 at the high altitude, a decrease in the SOC of the battery 13 can be prevented and the travel distance of the vehicle 1 can be extended.

In the method for controlling a vehicle according to the first embodiment, in the control step (step S508), the driving force of the electric motor 14 is limited such that the electric power generated by the engine 11 under the environment in which the output of the engine 11 is limited is larger than the required electric power of the electric motor 14.

According to such a method for controlling a vehicle, since the amount of electric power generated by the engine 11 decreases at a high altitude, by setting the output value of the electric motor 14 to be smaller than the maximum output value of the engine 11 at the high altitude, a decrease in the SOC of the battery 13 can be prevented and the travel distance of the vehicle 1 can be extended.

In the method for controlling a vehicle according to the first embodiment, in the control step (steps S510 and S511), when the vehicle 1 is traveling in the environment in which the output of the engine 11 is limited, the driving force is limited in the output constant region of the electric motor 14.

According to such a method for controlling a vehicle, a comfortable operation environment can be provided for the driver by adjusting the driving force of the electric motor 14 in the output constant region.

The system for controlling the vehicle 1 according to the first embodiment includes: the electric motor 14 that drives the vehicle 1; the engine 11 that drives the generator 12 that generates electric power to be supplied to the electric motor 14; the battery 13 that is chargeable by the generator 12 and electrically connected to the electric motor 14; and the drive system controller 100 (example of a controller) that controls the electric motor 14. The drive system controller 100 limits the driving force of the electric motor 14 when the vehicle 1 is traveling in the environment in which the output of the engine 11 is limited.

According to such a system for controlling the vehicle 1, the driving force of the electric motor 14 is limited in accordance with a decrease in the engine output at a high altitude, so that a decrease in the SOC of the battery 13 can be prevented and the travel distance of the vehicle 1 can be extended.

Second Embodiment

In the first embodiment, an example in which the upper limit value of the driving force of the electric motor is limited when the elevation of the vehicle exceeds the high altitude determination threshold TH1 is described. That is, an example in which the control when it is determined that the vehicle is present at a high altitude is performed in one stage is described. However, the control may be performed by setting a plurality of high altitude determination thresholds in advance, and executing limitation corresponding to each high altitude determination threshold at a timing when the elevation of the vehicle exceeds these high altitude determination thresholds. Therefore, in the second embodiment, an example in which the upper limit value of the driving force of the electric motor is limited by setting a plurality of high altitude determination thresholds will be described. The second embodiment is an example in which a part of the first embodiment is modified, and illustration and description are partially omitted for a part common to the first embodiment.

[Example of Limitation of Driving Force Corresponding to Vehicle Speed]

Figure 6:
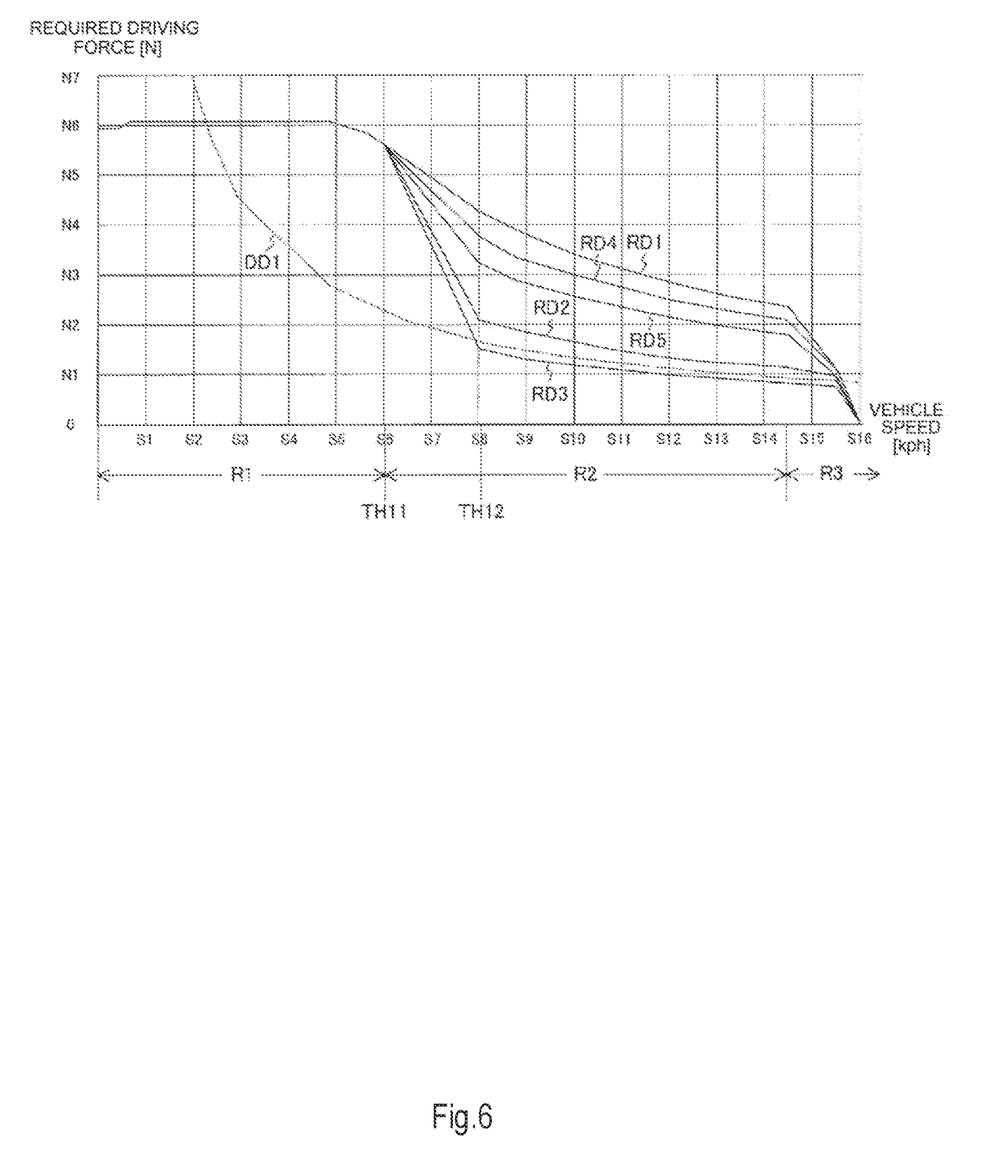
FIG. 6 is a diagram illustrating an example of a relation between a required driving force and a vehicle speed according to a second embodiment.

FIG. 6 is a diagram illustrating an example of a relation between a required driving force and a vehicle speed according to the second embodiment. FIG. 6 is an example in which a part of FIG. 4 is modified, and the same reference numerals are given and a part of the description thereof is omitted for a part common to FIG. 4.

In the second embodiment, an example in which two high altitude determination thresholds, that is, the high altitude determination threshold TH1 (for example, about 2,800 m) and a high altitude determination threshold TH3 (for example, about 2,300 m) are set is described.

A line RD5 indicates an example of a relation between the required driving force and the vehicle speed in a case where the elevation of the vehicle 1 is the high altitude determination threshold TH3. A line RD4 indicates an example of a relation between the required driving force and the vehicle speed when the kickdown switch is turned on in the case where the elevation of the vehicle 1 is the high altitude determination threshold TH3.

As illustrated in FIG. 6, in a case where the elevation of the vehicle 1 is the high altitude determination threshold TH3, when the vehicle speed exceeds the vehicle speed threshold TH11, the driving force of the electric motor 14 is limited. However, the limit value in the case where the elevation of the vehicle 1 is the high altitude determination threshold TH3 is set to a value smaller than the limit value in the case where the elevation of the vehicle 1 is the high altitude determination threshold TH1.

In the second embodiment, an example in which the upper limit value of the driving force of the electric motor is limited by setting the two high altitude determination thresholds TH1 and TH3 is described, but three or more high altitude determination thresholds may be set to limit the upper limit value of the driving force of the electric motor.

As described above, according to the second embodiment, the driving force of the electric motor can be limited in accordance with a high altitude degree at a high altitude.

Third Embodiment

In the first and second embodiments, the vehicle 1 equipped with the kickdown switch has been described as an example. The first and second embodiments can also be applied to a vehicle in which a kickdown switch is not mounted. Therefore, in the third embodiment, a vehicle in which a kickdown switch is not mounted will be described as an example. The third embodiment is an example in which a part of the first and second embodiments is modified, and illustration and description are partially omitted for a part common to the first and second embodiments.

In the vehicle according to the third embodiment, the K/D determination unit 104 illustrated in FIG. 1 is omitted. In the third embodiment, when the driving force of the electric motor 14 is limited, the limitation considering the kickdown switch is not relaxed. Specifically, the limit values corresponding to the line DL2 illustrated in FIG. 3C, the line EB2 illustrated in FIG. 3D, the line RD2 illustrated in FIG. 4, and the line RD4 illustrated in FIG. 6 are not selected. Therefore, a decrease in the SOC of the battery 13 can be further prevented and the travel distance of the vehicle 1 can be further extended.

[Example of Operation of Control Device]

Figure 7:
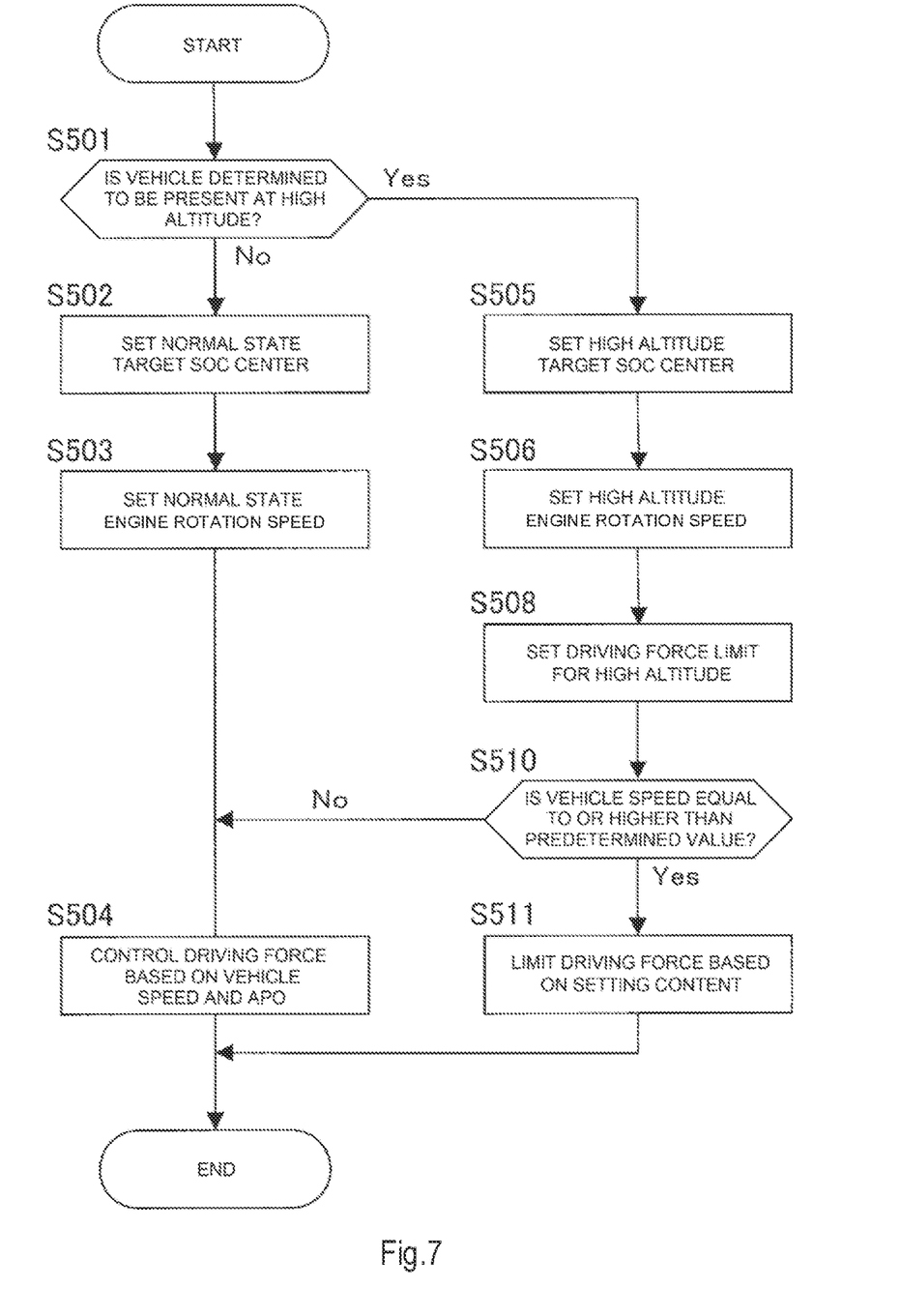
FIG. 7 is a flowchart illustrating an example of a processing procedure of a vehicle control process executed by a system for controlling a vehicle according to a third embodiment.

FIG. 7 is a flowchart illustrating an example of a processing procedure of a vehicle control process executed by a system for controlling a vehicle according to the third embodiment. The example illustrated in FIG. 7 is an example in which a part of FIG. 5 is modified, and the same reference numerals are given and a part of the description thereof is omitted for a part common to FIG. 5. Specifically, FIG. 7 is different from FIG. 5 in that steps S507 and S509 illustrated in FIG. 5 are omitted.

As described above, according to the third embodiment, in an environment in which the output of the engine 11 is limited for a vehicle on which the kickdown switch is not mounted, a decrease in the SOC of the battery 13 can be further prevented and the travel distance of the vehicle 1 can be further extended.

Although the embodiment of the present invention has been described above, the above embodiment is merely a part of application examples of the present invention, and is not intended to limit the technical scope of the present invention to the specific configurations of the above embodiment.

The invention claimed is:

1. A method for controlling a vehicle, the vehicle including an electric motor configured to drive the vehicle, an engine configured to drive a generator that generates electric power to be supplied to the electric motor, and a battery configured to be charged by the generator and electrically connected to the electric motor, the method comprising:

a control step of limiting a driving force of the electric motor in a case where the vehicle is traveling in an environment in which an output of the engine is limited, wherein in the control step, in the case where the vehicle is traveling in the environment, limiting the driving force of the electric motor by a limit amount that is set based on a vehicle speed of the vehicle when the vehicle speed of the vehicle is equal to or higher than a predetermined value, and not limiting the driving force of the electric motor when the vehicle speed of the vehicle is lower than the predetermined value.

2. The method for controlling the vehicle according to claim 1, wherein the control step further comprises:

in the case where the vehicle is traveling in the environment and the vehicle speed of the vehicle is higher than the predetermined value, relaxing limitation of the driving force of the electric motor when a predetermined acceleration operation is performed.

3. The method for controlling the vehicle according to claim 1, wherein the control step further comprises:

in the case where the vehicle is traveling in the environment, setting an SOC at which an additional charge amount of the battery is 0 kW to a larger value than that before the vehicle is traveling in the environment.

4. The method for controlling the vehicle according to claim 1, wherein the control step further comprises:

in the case where the vehicle is traveling in the environment, limiting the driving force of the electric motor based on the electric power generated by the engine under the environment.

5. The method for controlling a vehicle according to claim 4, wherein the control step further comprises:

limiting the driving force of the electric motor such that the electric power generated by the engine under the environment becomes larger than a required electric power of the electric motor.

6. The method for controlling a vehicle according to claim 1, wherein the control step further comprises:

in the case where the vehicle is traveling in the environment, limiting the driving force in an output constant region of the electric motor.

7. A system for controlling a vehicle comprising:

an electric motor configured to drive the vehicle;

an engine configured to drive a generator that generates electric power to be supplied to the electric motor;

a battery configured to be charged by the generator and electrically connected to the electric motor; and a controller configured to:

control the electric motor by limiting a driving force of the electric motor in a case where the vehicle is traveling in an environment in which an output of the engine is limited, wherein in the case where the vehicle is traveling in the environment, the controller is configured to limit the driving force of the electric motor by a limit amount, the limit amount of the driving force of the electric motor set based on a vehicle speed of the vehicle when the vehicle speed is equal to or higher than a predetermined value, and the controller is configured to not limit the driving force of the electric motor when the vehicle speed of the vehicle is lower than the predetermined value.

\* \* \* \* \*